United States Patent [19]
Kushita

[11] Patent Number: 5,835,508
[45] Date of Patent: Nov. 10, 1998

[54] NETWORK FOR TRANSMITTING INFORMATION DATA WITHOUT ERROR CORRECTION WHEN A TRANSMISSION CHANNEL QUALITY IS GOOD, OR WITH REDUNDANCY BITS OF A PREDETERMINED LENGTH ADDED TO EACH DATUM WHEN THE CHANNEL QUALITY IS POOR

[75] Inventor: Masayuki Kushita, Tokyo, Japan

[73] Assignee: NEC Corporation, Tokyo, Japan

[21] Appl. No.: 601,866

[22] Filed: Feb. 15, 1996

[30] Foreign Application Priority Data

Feb. 15, 1995 [JP] Japan ................................ 7-049295

[51] Int. Cl.$^6$ ......................... G08C 25/02; H03M 13/00
[52] U.S. Cl. ................................. 371/32; 371/35
[58] Field of Search ................. 371/32, 33, 34, 371/41, 35

[56] References Cited

U.S. PATENT DOCUMENTS

| | | | |
|---|---|---|---|
| 4,110,558 | 8/1978 | Kageyama et al. | 375/357 |
| 4,138,678 | 2/1979 | Kirner | 343/173 |
| 4,584,685 | 4/1986 | Gajjar | 371/35 |
| 4,716,573 | 12/1987 | Bergstrom et al. | 375/202 |
| 4,967,413 | 10/1990 | Otani | 371/37.4 |
| 5,001,776 | 3/1991 | Clark | 455/226.2 |
| 5,371,737 | 12/1994 | Nelson et al. | 370/314 |
| 5,430,743 | 7/1995 | Marturano et al. | 371/5.5 |
| 5,477,550 | 12/1995 | Crisler et al. | 371/32 |

FOREIGN PATENT DOCUMENTS

| | | |
|---|---|---|
| 58-178650 | 10/1983 | Japan . |
| 63-172535 | 7/1988 | Japan . |
| 4100360 | 4/1992 | Japan . |
| 4507334 | 12/1992 | Japan . |
| 661921 | 3/1994 | Japan . |

OTHER PUBLICATIONS

Lin et al; Error Control Coding, Fundamentals and Applications; Prentice–Hall, Inc.; pp. 271, 272, 441, 442, Jan. 1983.

*Primary Examiner*—Reba I. Elmore
*Assistant Examiner*—Robert J. Dolan
*Attorney, Agent, or Firm*—Sughrue, Mion, Zinn, Macpeak & Seas, PLLC

[57] ABSTRACT

In order to transmit information data from a station to another station through a transmission channel, only the information data ($a_{31}$ to $a_{00}$, $b_{31}$ to $b_{00}$, etc) are transmitted when the channel has a good channel quality. When the channel quality is bad, error correction code words are composed for transmission by adding redundancy bits ($A_{15}$ to $A_{00}$, $B_{15}$ to $B_{00}$, etc) to the information data. When the channel quality is bad even with transmission of the code words, error correction code blocks are composed by interleaving information bits (a's, b's, etc) and the redundancy bits in a selected number of code words with the selected number increased from two depending on the channel quality. Alternatively, such data, words, or blocks are transmitted with a transmission rate adjusted.

37 Claims, 7 Drawing Sheets

(A) | Sync1 | $a_{31} a_{30} \cdots a_{16} a_{15} a_{14} \cdots a_{00}$ | $b_{31} b_{30} \cdots b_{16} b_{15} b_{14} \cdots b_{00}$ | $c_{31} c_{30} \cdots c_{16} c_{15} c_{14} \cdots c_{00}$ | $d_{31} d_{30} \cdots d_{16} d_{15} d_{14} \cdots d_{00}$ | $e_{31} e_{30} \cdots$ (B) | Sync2 | $a_{31} a_{30} \cdots a_{16} A_{15} A_{14} \cdots A_{00}$ | $b_{31} b_{30} \cdots b_{16} C_{15} C_{14} \cdots C_{00}$ | $b_{15} b_{14} \cdots b_{00} D_{15} D_{14} \cdots D_{00}$ | $c_{31} c_{30} \cdots$ (C) | Sync3 | $a_{31} a_{15} a_{30} a_{14} a_{29} a_{13} a_{28} a_{12} a_{27} a_{11} a_{26} a_{10} \cdots A_{00} B_{00}$ | $b_{31} b_{15} b_{30} b_{14} b_{29} b_{13} b_{28} b_{12} b_{27} b_{11} b_{26} b_{10} \cdots C_{00} D_{00}$ | $c_{31} c_{15} c_{30} c_{14} \cdots$ (D) | Sync4 | $a_{31} a_{15} b_{31} a_{30} a_{14} b_{30} a_{29} a_{13} b_{29} a_{28} a_{12} b_{28} a_{27} a_{11} b_{27} a_{26} a_{10} b_{26} a_{25} \cdots A_{00} B_{00} C_{00}$ | $b_{15} c_{31} c_{15} b_{14} c_{30} c_{14} b_{13} c_{29} c_{13} b_{12} c_{28} c_{12} b_{11} c_{27} c_{11} \cdots$

FIG. 5

NETWORK FOR TRANSMITTING INFORMATION DATA WITHOUT ERROR CORRECTION WHEN A TRANSMISSION CHANNEL QUALITY IS GOOD, OR WITH REDUNDANCY BITS OF A PREDETERMINED LENGTH ADDED TO EACH DATUM WHEN THE CHANNEL QUALITY IS POOR

BACKGROUND OF THE INVENTION

This invention relates to information data transmission through a transmission channel for transmitting either a radio frequency signal or an optical signal, namely, to a data transmission network for transmitting information data between a pair of stations, such as from a source station to a destination station, through the transmission channel in consideration of a channel quality of the transmission channel. This invention relates furthermore to such a source station and is specifically adapted to application to a case where each of the source and the destination stations is a selectively called wireless station. In the manner which will later be described, the source station comprises a buffer for buffering the information data as buffered data for transmission to the wireless channel. As a consequence, this invention is applicable to a specific case where the data transmission network additionally comprises a base station for transmitting the information data to the source station for further transmission to the destination station.

It is known in a data transmission network of the type described to convert at the source station the information data to error correction codes by adding redundancy bits of a predetermined bit length to each information datum. The information data have been converted to the error correction codes in order to cope with noise introduced in the wireless channel to the information data being transmitted and in consideration of a reception sensitivity at the destination station. Received at the destination station, the error correction codes are used in detecting errors and in correcting the errors to produce correct and true reproductions of the information data. This, however, requires useless conversion processing and unduly lengthens transmission time to adversely affect effective use of the transmission channels when the transmission channel has an excellent channel quality and when the reception sensitivity is excellent.

Various manners are known to get rid of disadvantages of the type described in the foregoing. For example, Japanese Patent Prepublication (A) No. 172,535 of 1988 discloses information data transmission wherein each information datum is supplemented with the redundancy bit of a bit length which is varied in consideration of the channel quality. This makes it possible to deal with the information data at the source and the destination stations in an optimal transmitting and processing time and to effectively use the transmission channel.

This technique of the Japanese Patent Prepublication is, however, still objectionable. This is because the transmission time grows enormously when the channel quality becomes worse. The efficiency of transmission is accordingly adversely affected.

In a selectively called wireless station, which is usually battery operated, transmission and/or reception of the information data involve consumption of a battery. Necessity of a long transmission time is therefore a serious problem.

SUMMARY OF THE INVENTION

It is consequently an object of this invention to provide a data transmission network which is for transmitting information data from a source station to a destination station through a transmission channel and which is operable in a shortest possible transmission and reception time.

It is another object of this invention to provide a data transmission network which is of the type described and which makes it possible to effectively use the transmission channel.

It is still another object of this invention to provide a data transmission network which is of the type described and which will not unduly lengthen the transmission and reception time even when the transmission channel has an objectionable channel quality.

It is yet another object of this invention to provide a data transmission network which is of the type described and which lengthens a serviceable time length of a battery when each of the source and the destination stations is a selectively called wireless station.

It is a different object of this invention to provide a source station for use in a data transmission network of the type described.

Other objects of this invention will become clear as the description proceeds.

In accordance with an aspect of this invention, there is provided a data transmission network for transmitting information data from a source station to a destination station through a transmission channel in consideration of a channel quality of the transmission channel, wherein the source station comprises: (a) first transmitting means for transmitting only the information data when the channel quality is good; and (b) second transmitting means for transmitting, when the channel quality is bad, the information data as error correction code words with each code word composed of each information datum and redundancy bits of a predetermined bit length.

In accordance with a different aspect of this invention, there is provided a source station which is for transmitting information data having a first predetermined bit length in common to a destination station through a transmission channel in consideration of a channel quality of the transmission channel and which comprises: (a) first transmitting means for transmitting only the information data when the channel quality is good; and (b) second transmitting means for transmitting, when the channel quality is bad, the information data as error correction code words with each code word composed of each information datum and redundancy bits of a second predetermined bit length.

BRIEF DESCRIPTION OF THE DRAWING

FIG. 5 schematically shows information data and error correction code words and blocks for use in the data transmission network mentioned in conjunction with FIG. 2;

Figure 1:
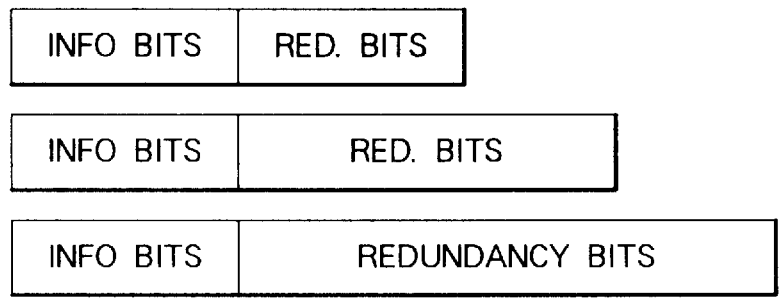
FIG. 1 is a schematic diagram for use in describing operation of a conventional data transmitting network.

DESCRIPTION OF THE PREFERRED EMBODIMENTS:

Referring to FIG. 1, a conventional manner of data transmission through a radio channel will first be described in order to facilitate an understanding of the present invention. This manner of data transmission is revealed in the Japanese patent prepublication cited heretobefore.

For transmission through the radio channel, an information datum has a predetermined bit length L. In consideration of a channel quality of the radio channel, redundancy bits of a variable bit length m are added to the information datum. More particularly, the variable bit length is set at a small number when the channel quality is good. As the channel quality becomes worse, the variable bit length is lengthened in the manner exemplified from the top to the bottom. This requires accordingly lengthened processing and transmission times.

Figure 2:
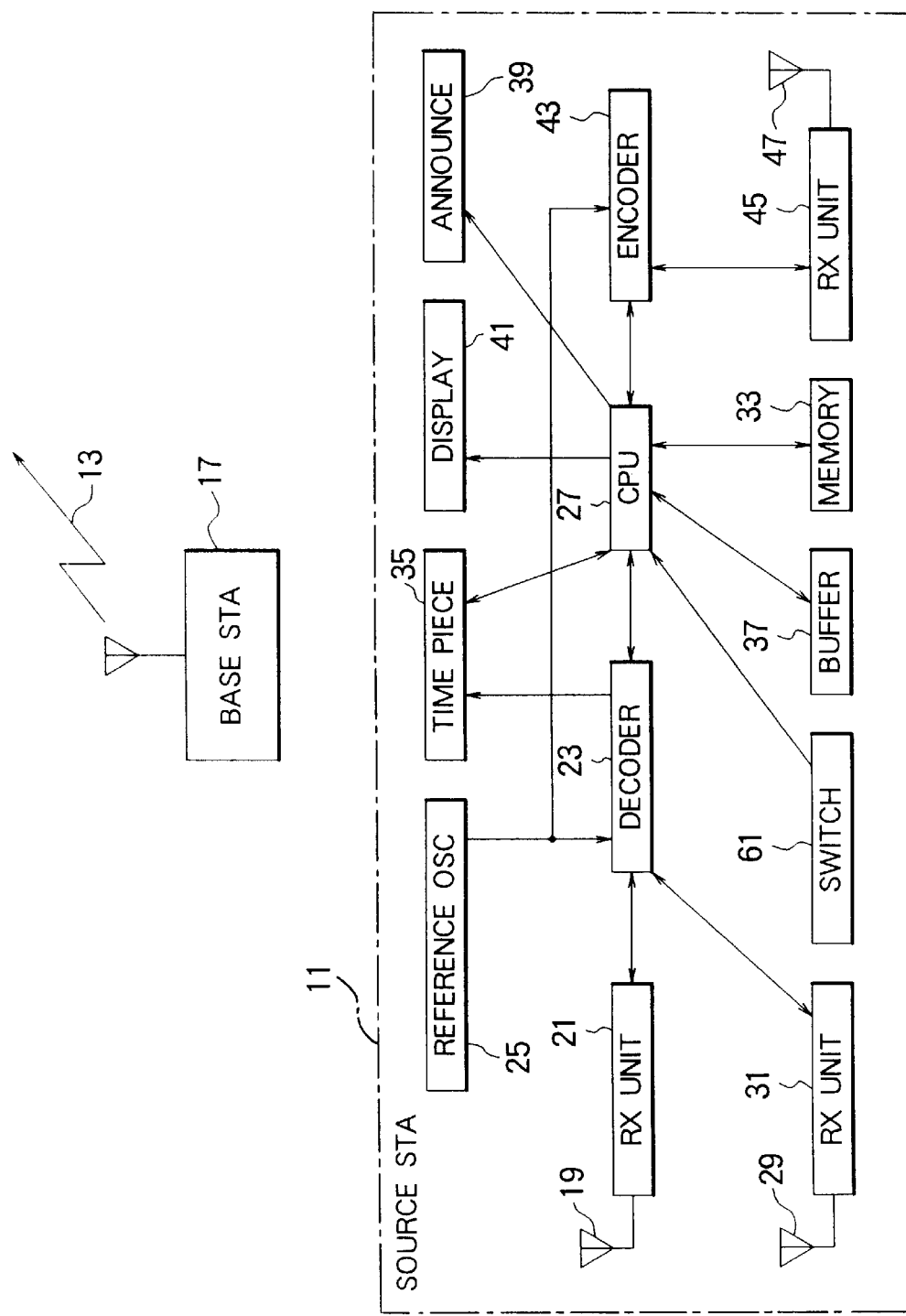
FIG. 2 is a block diagram illustrative in a data transmission network according to the instant invention of a base station and a source station which is according to an embodiment of this invention.

Referring now to FIG. 2, the description will proceed to a source station 11 according to a preferred embodiment of this invention for use in a data transmission system for transmitting information data through a transmission channel 13 having a channel quality which depends on a path from the source station to a destination station 15 (later illustrated) and may vary from time to time. It will be assumed merely for clarity of the description that the transmission channel 13 is a radio channel for transmitting a radio frequency signal and that the source station 11 is a selectively called radio station for transferring information data from a base station 17 to the destination station. Each information datum has a first predetermined bit length which will be designated by the reference symbol L as in FIG. 1.

The source station 11 has a first source reception antenna 19 for receiving the information data as source received data from the base station 17 and comprises a first source receiving unit 21 supplied with the source received data. Amplifying, demodulating, and waveform shaping the received data, the receiving unit 21 delivers source demodulated data to a first source decoder 23. Frequency dividing a source system clock generated by a source reference oscillator 25 into a source sampling clock of a predetermined sampling frequency, the source decoder 23 samples source demodulated data to detect a frame synchronizing signal among the source demodulated data and to establish frame synchronism with the source received data. After establishment of the frame synchronism, a source CPU 27 controls the source receiving unit 21 through the source decoder 23 for intermittent reception of information data, namely, for battery saving. The information data have the first predetermined bit length in common.

The source station 11 has a second source reception antenna 29 and comprises a second source receiving unit 31. These structural elements are for signals sent back from the destination station 15 in the manner which will presently be described.

The source station 11 comprises a source memory 33 in which a source identification number is preliminarily stored. Reading the source identification number, the source CPU 27 makes the source decoder 23 collate the source identification number with a source received identification number which the source decoder 23 locates in the source demodulated signal delivered from the first source receiving unit 21.

If collation is successful, the source decoder 23 locates the information data which follow in the source demodulated data the source received identification number and which is delivered to the source CPU 27. The source station 11 may be assigned with a plurality of identification numbers. In this event, the source station 11 deals with one of the identification numbers as the source identification number at a time.

From the source decoder 23, the source sampling clock is delivered to a source time piece 35 which counts a source local time. Having found coincidence between the source identification number and the source received identification number, the source detector 23 informs the CPU 27 of this coincidence. Informed of the coincidence, the source CPU 27 stores in a source buffer 37 the source local time read from the source time piece 35 and a received calling message delivered thereto from the source decoder 23. The source buffer 37 keeps such messages in an order of the source local time. The messages may be encrypted into encrypted data. In this event, encryption keys are stored either in the source memory 33 or in the source buffer 37. Decrypting the encrypted data into information bits, the source CPU 27 stores the information bits in the source buffer 37 information datum by information datum.

At the same time, the source CPU 27 informs an attendant of the source station 11 of selective call of the source station 11. For this purpose, the source CPU 27 energizes an announcing unit 39 comprising a driver and at least one of a loudspeaker, an LED, and a vibrator that is driven by the driver. Moreover, the source CPU 27 reads each information datum from the source buffer 37 as a read datum and controls a driver for a display unit 41 for visual display of the information datum of a received message after character conversion of the read datum.

In addition, the source CPU 27 delivers the read datum to a source encoder 43 for producing such read data as a serial source encoder output signal in the manner which will presently be described. Supplied with the serial source encoder output signal from the source encoder 43, a source transmitting unit 45 transmits a modulated signal to the destination station 15 through a source transmission antenna 47, modulating the serial source encoder output signal into the modulated signal.

Figure 3:
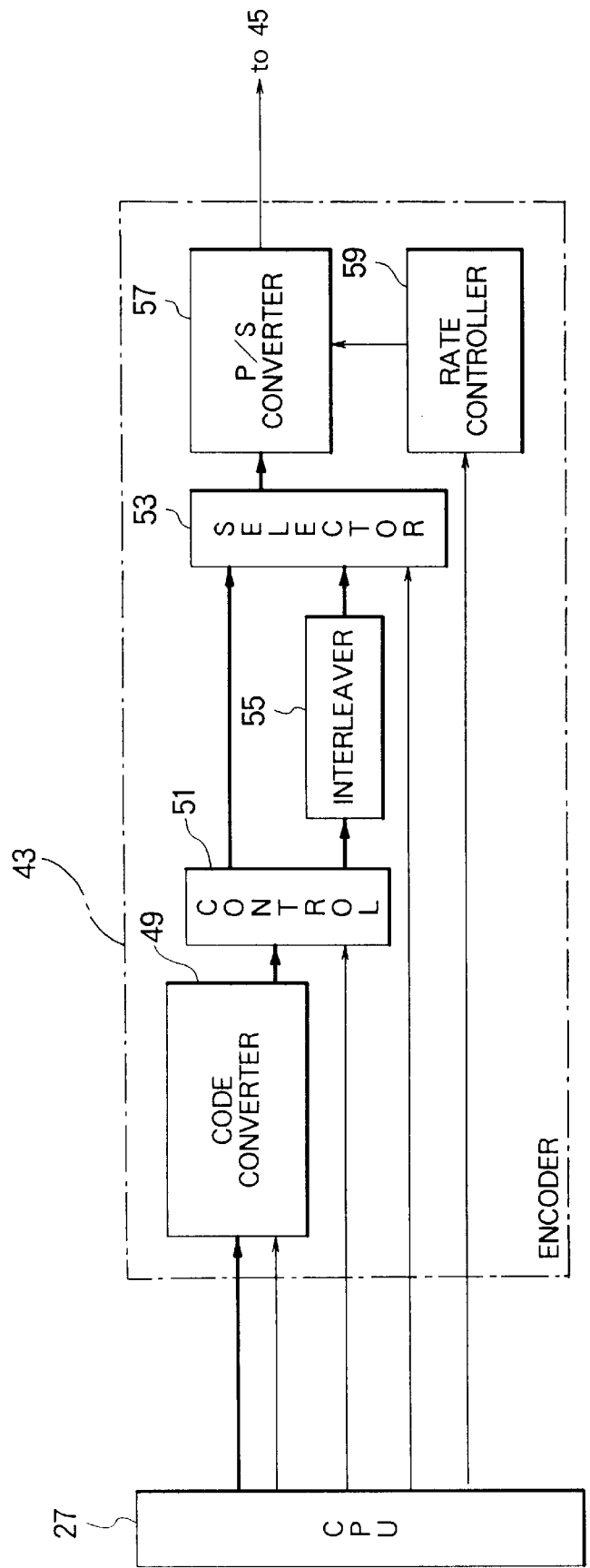
FIG. 3 shows in blocks a CPU and an encoder for use in the source station illustrated in FIG. 2.

Turning to FIG. 3 with FIG. 2 continuously referred to, the source encoder 43 comprises a code converter 49 supplied from the CPU 27 with the information data as parallel inputs. Controlled by a code conversion control signal supplied from the source CPU 27, the code converter 49 produces either the information data as they are as parallel information data or parallel error correction codes or code words with redundancy bits of a second predetermined bit length M added to each of the parallel information data. Controlled by a controller control signal supplied from the source CPU 27, a controller 51 delivers the parallel information data or the parallel error correction codes directly to a selector 53 and the parallel error correction codes to an interleaver 55 for supplying the selector 53 with an interleaver output which will later be described. Controlled by a selector control signal supplied from the source CPU 27, the selector 53 selects the parallel information data, the error correction codes, or the interleaver output as a selector output. Connected to the selector 53, a parallel-to-serial (P/S) converter 57 converts the selector output to a serial signal, which has a certain bit rate and is delivered to the source transmitting unit 45 as the second source encoder output signal. Controlled by a rate controller control signal supplied from the source CPU 27, a transmission rate controller 59 controls, in turn, the transmission rate.

Turning back to FIG. 2, the attendant may manually operate a source control switch 61 to put the source CPU 27 in a data transfer mode of making the source transmitting unit 45 transfer the information data to the destination station 15 through the radio channel. In response, the source CPU 27 reads a first synchronizing signal Sync1 and a first starting signal stored either in the source memory 33 or in the source buffer 37. The first synchronizing and starting signals serve collectively as a first start signal which has the first predetermined bit length and is preliminarily known by the destination station 15. Reading the information data from the source buffer 37, the source CPU 27 delivers the first start signal and the information data to the source encoder 43.

The source encoder 43 supplies the source transmitting unit 45 first with the first start signal and subsequently with the serial source encoder output signal. While thus controlling the source encoder 43, the source CPU 27 on-off controls the source transmitting unit 45 through the source encoder 43. Monitoring operation of the source transmitting unit 45 through the source encoder 43, the source CPU 27 turns the source transmitting unit 45 off. Thereafter, the source CPU 27 controls the source decoder 23 and returns the source receiving unit 21 on.

Figure 4:
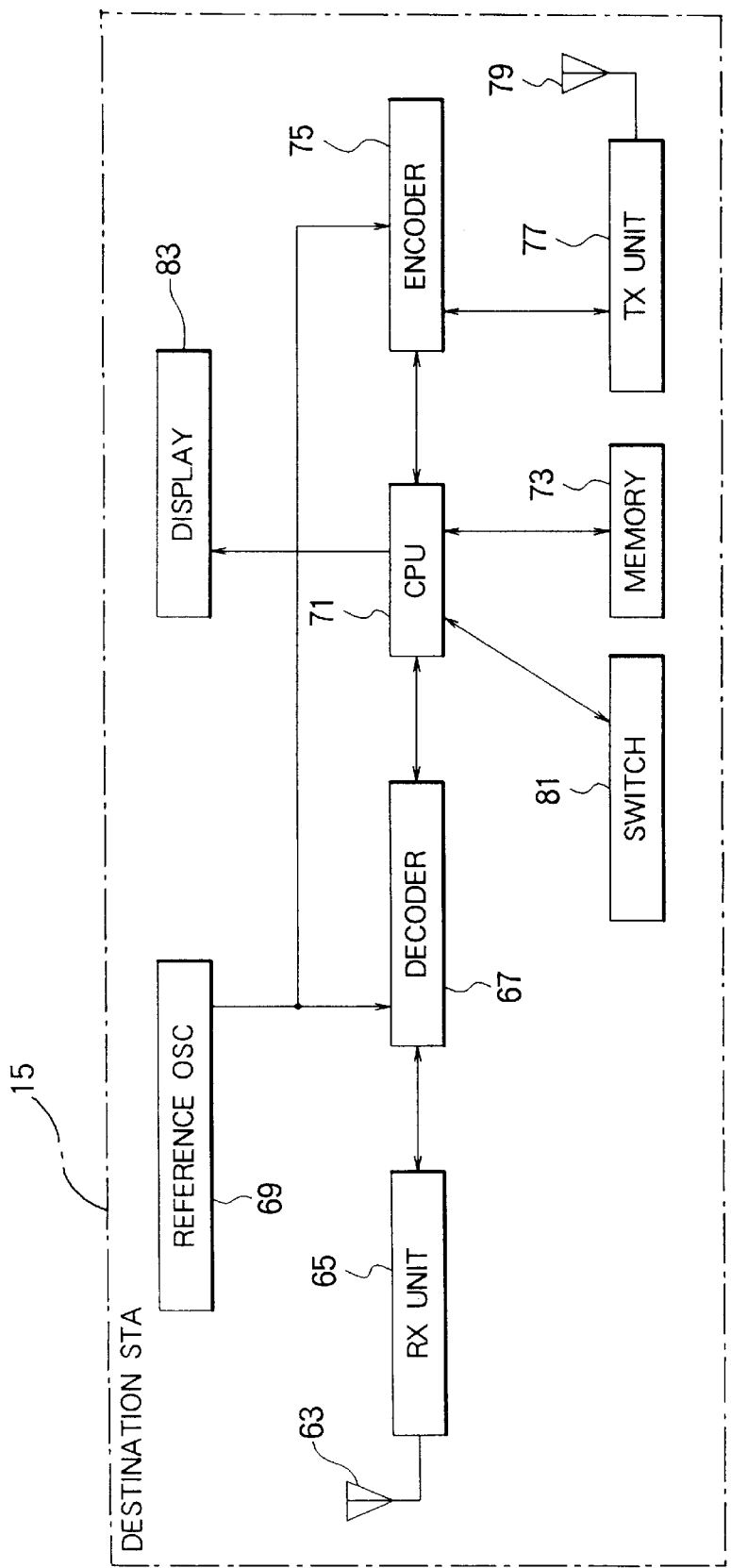
FIG. 4 is a partial block diagram of a destination station for use in combination with the source station depicted in FIG. 2.

Turning now to FIG. 4 with FIG. 2 continuously referred to, the destination station 15 is similar in structure to the source station 11. In principle, the destination station 15 is operable, although so named, as another source station.

In FIG. 4, a destination reception antenna 63 receives the modulated signal transmitted from the source station 11. Preceding the information data, the modulated signal includes the first start signal. A destination receiving unit 65 is for amplification, demodulation, and waveform shaping and delivers destination demodulated data to a destination decoder 67. Frequency dividing a destination system clock generated by a destination reference oscillator 69 into a destination sampling clock, the destination decoder 67 detects the first synchronizing signal in samples of the destination demodulated data. When the first synchronizing signal is found, the source decoder 67 locates the first starting signal.

Having found the first starting signal, the source decoder 67 puts a destination CPU 71 into operation. Together with the first synchronizing signal which is identical with that used in the source station 11, a due reception acknowledging signal is preliminarily stored as an acknowledge signal in a destination memory 73. Put into operation, the destination CPU 71 delivers the first synchronizing signal and the acknowledge signal from the destination memory 73 to a destination encoder 75.

The destination decoder 75 supplies a destination transmitting unit 77 serially with the first synchronizing signal and the acknowledge signal. With modulation, the destination transmitting unit 77 transmits the first synchronizing and acknowledge signals through a destination transmission antenna 79 back to the source station 11 collectively as a first channel quality signal indicative of whether or not the radio channel 13 has a good channel quality.

Again turning back to FIG. 2, the second source reception antenna 29 supplies the second source receiving unit 31 with the first channel quality signal sent back from the destination station 15 in response to the first start signal. Responsive to the first channel quality signal received by the second source receiving unit 31 and detected by the source decoder 23, the source CPU 27 judges that the radio channel 13 has a good channel quality. In this event, the source CPU 27 makes the source encoder 43 and the source transmitting unit 45 transmit only the information data to the destination station 15.

If the destination station 15 can not detect at least one of the first synchronizing and starting signals, the first channel quality signal is not sent back to the source station 11. Either in this event or if the source decoder 23 does not detect the first channel quality signal in a predetermined time interval after the source CPU 27 confirmed completion of transmission of the first start signal to the destination station 15, the source CPU 11 judges that the channel quality is bad or objectionable. Thereupon, the source CPU 27 reads a second synchronizing signal Sync2 which is preliminarily stored either in the source memory 33 or in the source buffer 37 and is different from the first synchronizing signal. The source CPU 27 delivers the second synchronizing signal to the source encoder 43.

In the source encoder 43 exemplified in FIG. 3, the code converter 49 converts the information data to the error correction code words which have a sum bit length of L+M in common. Through the controller 51, the selector 53, and the parallel-to-serial converter 57 with no control by the transmission rate controller 59, the code words are delivered to the source transmitting unit 45 for transmission to the destination station 15.

It is possible for the source transmitter unit 45 to transmit, immediately succeeding the second synchronizing signal, the first starting signal. In FIG. 3, the code converter 49 adds the redundancy bits to the first starting signal to produce a second starting signal having the sum bit length of the first and the second predetermined bit lengths. The source transmitting unit 45 transmits the second synchronizing signal and the second starting signal as a second start signal to the destination station 15.

In FIG. 4, the destination receiving unit 65 receives the second start signal. Having detected the second start signal with bit incoincidence allowed to a predetermined extent, the destination decoder 67 detects errors in the second start signal and corrects the errors, if the errors are correctable, to inform the destination CPU 71 of a bit error rate and of whether or not the second start signal is substantially correctly received. The destination CPU 71 reads the second synchronizing signal and the acknowledge signal from the destination memory 73. The destination encoder 75 adds the redundancy bits to the acknowledge signal to produce a second channel quality signal. The destination transmitting unit 77 transmits the second channel quality signal back to the source station 11. Alternatively, the destination CPU 71 delivers the second synchronizing signal and the bit error signal to the destination encoder 75. In response, the destination encoder 75 produces a primary channel quality signal. In further response, the destination transmitting unit 77 transmits the primary channel quality signal back to the source station 11. Each of the second channel quality signal and the primary channel quality signal has the sum bit length.

In FIG. 2, the second source receiving unit 31 receives first the second channel quality signal. The source decoder 23 detects the second channel quality signal with errors of the bit coincidence of the predetermined extent allowed and error corrects errors, if the errors are correctable. After error correction, the source decoder 23 puts the source CPU 27 into operation and delivers the second quality signal to the source CPU 27.

Analyzing the second channel quality signal received from the source decoder 23 in this manner, the source CPU 27 judges whether or not the channel quality is good. It will be presumed that the channel quality is good. In this event, the source CPU 27 controls the source encoder 43 to make the source transmitting unit 45 transmit the error correction code words to the destination station 15. In the meanwhile, the destination station 15 transmits the primary channel quality signal back to the second station 11.

It will now be presumed that the source CPU 27 judges that either the second channel quality signal or the primary channel quality signal indicates that the channel quality is bad even with transmission of the error correction code words. Alternatively, it will be presumed that the source CPU 27 is not supplied from the source decoder 23 with the second or the primary channel quality signal in the predetermined time interval after the source CPU 27 confirmed completion of transmission of the second start signal to the destination station 15. In either event, the source CPU 27 reads a third synchronizing signal Sync3 from either the source memory 33 or the source buffer 37 and controls the source encoder 43 to put in operation the interleaver 55 described in conjunction with FIG. 3.

In FIGS. 2 through 4, the controller 51 is controlled also by the source CPU 27. Controlled in various manners which will become clear as the description proceeds, the controller 51 supplies the interleaver 55 with the third synchronizing signal, a fourth synchronizing signal Syn4, and like synchronizing signals and with a selected number N of the error correction code words rather than with only the information data as they stand. First, the selected number is set at two.

Supplied with the first starting signal in addition to the third synchronizing signal, the interleaver 55 produces a third start signal of twice the sum bit length by interleaving the first starting signal and the redundancy bits into a third starting signal. The source transmitting unit 45 transmits the third start signal to the destination station 15. In response, the destination station 15 transmits back to the source station 11 a third channel quality signal by interleaving the acknowledge signal and the redundancy bits.

In FIG. 2, it will be presumed that the source CPU 27 judges the third channel quality signal received by the second receiving unit 31 and decoded with error correction by the source decoder 23. In this event, the source encoder 43 produces the information data as the error correction block by interleaving two error correction code words and two sets of redundancy bits. The source transmitting unit 45 transmits the code blocks to the destination station 15.

In FIG. 4, the destination decoder 67 confirms the third synchronizing signal, deinterleaves the error correction code blocks received by the destination receiving unit 65, and produces the error correction code words by which each code block is composed. Supplied with these code words, the destination CPU 71 judges whether or not the code blocks are received with correctable errors, namely, with a bit error rate within a certain upper limit. The destination encoder 75 produces a secondary channel quality signal in response to the error bit rate, that is, in response to the code blocks received at the destination station 15.

In FIGS. 2 and 3, the source CPU 27 judges whether or not the channel quality is good when the code blocks are transmitted with the selected number of two. If the channel quality is good under the circumstances, the source station 11 continues transmission of these code blocks. If the channel quality if bad, the source CPU 27 reads the fourth synchronizing signal from one of the source memory and buffer 33 and 37 to transmit a fourth start signal to the destination station 15 and increases the selected number by one to three. The controller 51 delivers three code words to the interleaver 55. When the code words are not an integral multiple of the selected number, transmission end signals are used in place of one or two code words.

Referring afresh to FIG. 5 and again to FIG. 2, the first through the fourth start signals are labelled by reference symbols Sync1 through Sync4 and are schematically illustrated leftmost of a first or top row through a fourth or bottom row which are identified by legends (A) through (D). The information data, the error correction code words, and the error correction code blocks with the selected number set at two and three are depicted along the first through the fourth rows, respectively. It is surmised merely for simplicity of illustration that each of the first and the second predetermined bit lengths L and M is sixteen bits long. The sum bit length becomes equal to thirty-two bits. The error correction code words have the sum bit length in common and are separated from each other by a vertical solid line in each of the first and the second rows although no code words are used in the first row. The error correction code blocks have two and three sum bit lengths in common in the third and the fourth rows and are segmented by a vertical solid line.

In the first row, information bits of the information data are indicated by $a_{31}$, $a_{30}$, . . . , $a_{16}$; $a_{15}$, $a_{14}$, . . . , $a_{00}$; $b_{31}$, $b_{30}$, . . . , $b_{16}$; $b_{15}$, $b_{14}$, . . . , $b_{00}$; $c_{31}$, $c_{30}$, . . . , $c_{16}$; and so forth. The redundancy bits are indicated in the second through the fourth rows by $A_{15}$, $A_{14}$, . . . , $A_{00}$; $B_{15}$, $B_{14}$, . . . , $B_{00}$; $C_{15}$, $C_{14}$, . . . , $C_{00}$; $D_{15}$, $D_{14}$, . . . , $D_{00}$; and so on. When the selected number of error correction code words are interleaved, the information and the redundancy bits are interleaved as exemplified along the third and the fourth rows.

Figure 6:
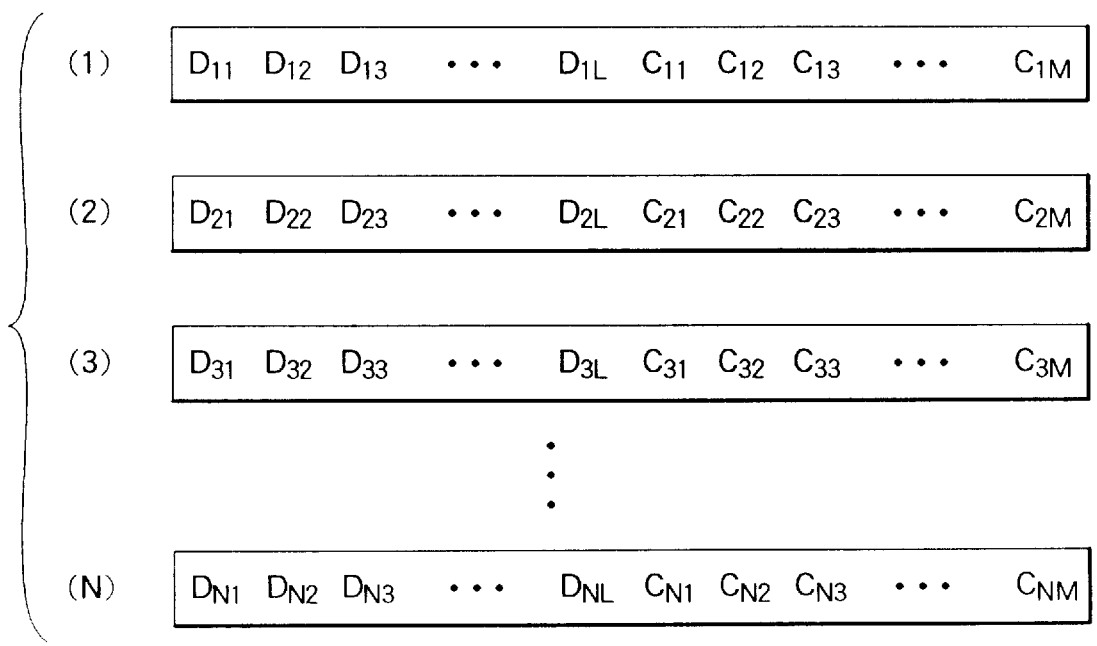
FIG. 6, drawn below FIG. 1, schematically shows a manner of composing one of the error correction blocks depicted in FIG. 5.

Turning to FIG. 6, first through N-th error correction code words are interleaved into an error correction code block. Along first or top through an N-th or bottom rows indicated by legends (1) through (N), the information data have the first predetermined bit length in common. In the first through the N-th code words, sets of the redundancy bits have the second predetermined bit length M in common. In a matrix fashion, the information bits are indicated as data bits $D_{n1}$, $D_{n2}$, $D_{n3}$, . . . , and $D_{nL}$, where n is variable from one to N. The error correction bits are indicated as correction bits $C_{n1}$, $C_{n2}$, $C_{n3}$, . . . , and $C_{nM}$.

Each error correction code block has N sum bit length and consists of first through N(L+M)-th block bits. In a typical manner of interleave, the first through the N-th block bits are first or preceding ones of the data bits of the first through the N-th code words, namely, $D_{11}$, $D_{21}$, $D_{31}$, . . . , and $D_{N1}$. The (N+1)-th through the 2 N-th block bits are second ones of the data bits, namely, $D_{12}$, $D_{22}$, $D_{32}$, . . . , and $D_{N2}$. The L(N+1)-th through the 2 LN-th block bits are L-th data with $D_{1L}$, $D_{2L}$, $D_{3L}$, . . . , and $D_{NL}$. The (L+1)(N+1)-th through the 2(L+1)N-th block bits are first correction bits of the first through the N-th code words, namely, $C_{11}$, $C_{12}$, $C_{13}$, . . . , and $C_{N1}$.

Reviewing FIGS. 2 through 6, it is possible to increase the selected number N one by one from two up to a predetermined integer which may be, for example, four or greater. This makes it possible to transmit the information data from the source station 11 to the destination station 15 even when noise may spontaneously adversely affect transmission of only the information data, of the error correction code word, and of the error correction code blocks with a relatively small positive integer used as the selected number.

It is unnecessary to continue transmission of the code words or blocks until the information data come to an end.

Instead, it is possible to switch, for example, transmission of the code words to transmission of only the information data when the primary channel quality signal indicates that the channel quality turns good.

Again reviewing FIGS. 2 through 6, the source CPU 27 may put the rate controller 59 into operation when the second or the primary channel quality signal indicates that the channel quality is bad even with transmission of the code words or when the third or the secondary channel quality signal indicates that the channel quality is bad even with transmission of the code blocks with the selected number N set at one of positive integers.

In practice, the data transmission rate is dynamically switched either faster or slower in consideration of the second and the third or the primary or the secondary channel quality signal received at the source station 11 from the destination station 15. Instead of using the rate controller 59, the source CPU 27 may vary the sampling clock in frequency. It should be noted in this connection that the synchronizing signals are transmitted at a predetermined transmission rate despite adjustment of the transmission rate for the start signals, the information data, and the error correction code words and blocks.

In FIG. 4, an attendant of the destination station 15 can manipulate a destination control switch 81 to put the destination CPU 71 in operation of reading the information data accumulated in the destination memory 73 as read data. Reading and subjecting to character conversion the read data, the destination CPU 71 energizes a destination display unit 83 to visually display the information data which are transmitted from the source station 11 illustrated with reference to FIGS. 2 and 3.

Figure 7:
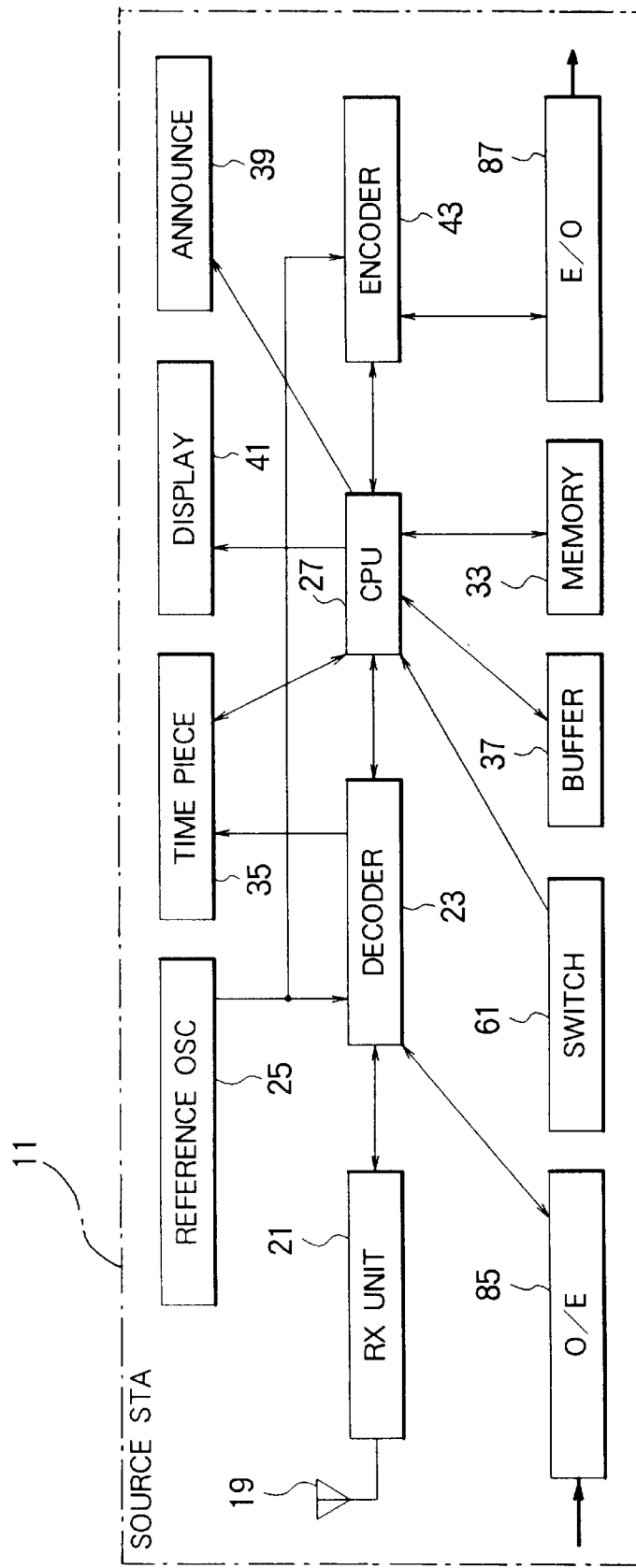
FIG. 7 is a block diagram of a source station according to a modification of that illustrated in FIG. 2.
Figure 8:
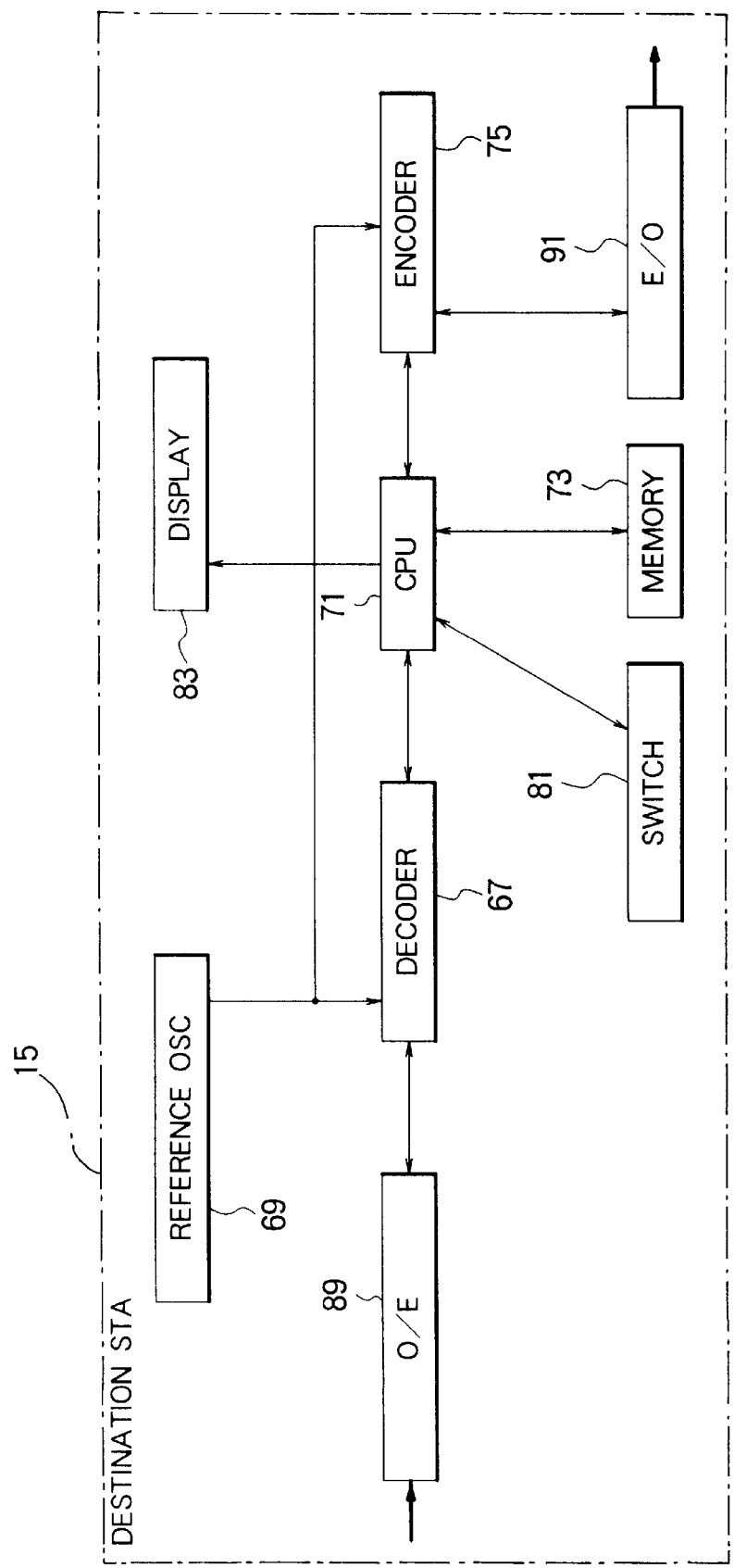
FIG. 8 is a block diagram of a destination station which is a modification of that depicted in FIG. 4.

Finally referring to FIGS. 7 and 8 with FIGS. 2 and 4 once again referred to, the source station 11 comprises instead of the second source reception antenna 29 and the second source receiving unit 31, a source optical-to-electric conversion (O/E) 85 which is connected to an optical transmission network, such as an optical fiber network, depicted by a thick arrowheaded line conveying an optical signal. For a combination of the source transmitting unit 45 and the source transmission antenna 47, substituted is a source electric-to-optical converter (E/O) 87 connected to the optical transmission network. Similarly, the destination station 15 comprises a destination optical-to-electric converter 89 and a destination electric-to-optical converter 91. Alternatively, the source optical-to-electric and electric-to-optical converters 85 and 87 are connected to the second source reception antenna 29 and to the source transmission antenna 47. The destination optical-to-electric and electric-to-optical converters 89 and 91 are connected to the destination reception and transmission antennas 63 and 79. Under the circumstances, the transmission channel 13 transmits the optical signal. Furthermore, it is readily possible to make the base station 17 transmit the information data or the optical signal for data transfer from the source station 11 to the destination station 15. In this event, another optical-to-electric converter is used instead of the first source receiving unit 21.

What is claimed is:

1. A data transmission network for transmitting information data from a source station to a destination station through a transmission channel in consideration of a channel quality of said transmission channel, wherein said source station comprises:

first transmitting means for transmitting only said information data when said channel quality is good; and second transmitting means for transmitting, when said channel quality is bad, said information data as error correction code words with each code word composed of each information datum and redundancy bits of a predetermined bit length;

said source station further comprising activating means: for activating, when said channel quality is good, said first transmitting means and deactivating said second transmitting means; and for activating, when said channel quality is bad, said second transmitting means and deactivating said first transmitting means.

2. A data transmission network as claimed in claim 1, wherein each of said source and said destination stations is a selectively called wireless station.

3. A data transmission network as claimed in claim 1, wherein said transmission channel is for transmitting one of a radio frequency signal and an optical signal.

4. A data transmission network as claimed in claim 1, wherein said source station further comprises third transmitting means for transmitting, when said channel quality is bad even with transmission of said code words, said information data as error correction code blocks with each code block composed by interleaving said information datum and said redundancy bits in a selected number of said code words and with said selected number increased one by one from two until said channel quality becomes good.

5. A data transmission network as claimed in claim 4, wherein said source station further comprises transmission rate control means for reducing, when said channel quality is bad even either with transmission of said code words at a transmission rate or with transmission of said code blocks at a transmission rate and with said selected number set at a selected one of two to a predetermined integer which is not less than two, said transmission rate.

6. A data transmission network as claimed in claim 5, characterised in that said destination station comprises:

receiving means for receiving said error correction code words and blocks as received code words and blocks when said second and said third transmitting means are activated, respectively, either without or with activation of said transmission rate control means; and monitoring and correcting means for monitoring a bit error rate of each of said received code words and blocks and for correcting errors in each of said received code words and blocks if said bit error rate indicates that said errors are correctable.

7. A data transmission network as claimed in claim 6, characterized in that said destination station further comprises channel quality signal transmitting means for transmitting a channel quality signal back to said source station to indicate that said channel quality is good and bad when said error bit rate indicates that said errors are and are not correctable.

8. A source station for transmitting information data having a first predetermined bit length in common to a destination station through a transmission channel in consideration of a channel quality of said transmission channel, said source station comprising:

first transmitting means for transmitting only said information data when said channel quality is good; and second transmitting means for transmitting, when said channel quality is bad, said information data as error correction code words with each code word composed of each information datum and redundancy bits of a second predetermined bit length;

said source station further comprising activating means: for activating, when said channel quality is good, said first transmitting means and deactivating said second transmitting means; and for activating, when said channel quality is bad, said second transmitting means and deactivating said first transmitting means.

9. A source station as claimed in claim 8, wherein each of said source and said destination stations is a selectively called wireless station.

10. A source station as claimed in claim 8, wherein said transmission channel is for transmitting one of a radio frequency signal and an optical signal.

11. A source station as claimed in claim 8, further comprising transmission rate control means for reducing, when said channel quality is bad even with transmission of said code words at a transmission rate, said transmission rate.

12. A source station as claimed in claim 11, further comprising buffering means for buffering said information data as buffered data to deliver said buffered data to one of said first and said second transmitting means that is put in operation.

13. A source station as claimed in claim 8, wherein said first transmitting means is activated by first starting means for transmitting a first start signal for use in said destination station in testing said channel quality before activation in said source station of said first transmitting means.

14. A source station as claimed in claim 13, wherein said first start signal comprises a first synchronizing signal and a first starting signal.

15. A source station as claimed in claim 13, further comprising first quality monitoring means for monitoring a first channel quality signal sent back from said destination station in response to said first start signal.

16. A source station as claimed in claim 15, wherein said second transmitting means is activated by second starting means for transmitting a second start signal for use in said destination station in testing said channel quality before activation in said source station of said second transmitting means.

17. A source station as claimed in claim 16, further comprising second quality monitoring means for monitoring a second channel quality signal sent back from said destination station in response to said second start signal.

18. A source station as claimed in claim 16, wherein said second start signal comprises a second synchronizing signal and a second starting signal.

19. A source station as claimed in claim 18, further comprising monitor and control means for monitoring a code word channel quality signal sent back from said destination station in response to errors detected in the code words received at said destination station.

20. A source station as claimed in claim 19, wherein said monitor and control means deactivates said second transmitting means and again activates said first transmitting means when said code word channel quality signal indicates that said channel quality is good.

21. A source station as claimed in claim 8, further comprising third transmitting means for transmitting, when said channel quality is bad even with transmission of said code words, said information data as error correction code blocks with each code block composed by interleaving said information datum and said redundancy bits in a selected number of said code words and with said selected number increased one by one from two until said channel quality becomes good.

22. A source station as claimed in claim 21, further comprising transmission rate control means for reducing, when said channel quality is bad even with transmission of said code blocks at a transmission rate and with said selected number set at a selected one of two to a predetermined integer which is not less than two, said transmission rate.

23. A source station as claimed in claim 22, further comprising buffering means for buffering said information data as buffered data to deliver said buffered data to one of said first through said third transmitting means that is put in operation.

24. A source station as claimed in claim 23, further comprising activating means: for activating, when said channel quality is good, said first transmitting means and deactivating said second and said third transmitting means; for activating, when said channel quality is bad with transmission of only said information data, said second transmitting means and deactivating said first and said third transmitting means; and for activating, when said channel quality is bad even with transmission of said code words, said third transmitting means and deactivating said first and said second transmitting means.

25. A source station as claimed in claim 23, wherein said first transmitting a means is activated by first starting means for transmitting a first start signal for use in said destination station in testing said channel quality before activation in said source station of said first transmitting means.

26. A source station as claimed in claim 25, wherein said first start signal comprises a first synchronizing signal and a first starting signal.

27. A source station as claimed in claim 25, further comprising first quality monitoring means for monitoring a first channel quality signal sent back from said destination station in response to said first start signal.

28. A source station as claimed in claim 27, wherein said second transmitting means is activated by second starting means for transmitting a second start signal for use in said destination station in testing said channel quality before activation in said source station of said second transmitting means.

29. A source station as claimed in claim 28, wherein said second start signal comprises a second synchronizing signal and a second starting signal.

30. A source station as claimed in claim 28, further comprising second quality monitoring means for monitoring a second channel quality signal sent back from said destination station in response to said second start signal.

31. A source station as claimed in claim 30, further comprising primary monitor and control means for monitoring a primary channel quality signal sent back from said destination station in response to errors detected in the code words received at said destination station.

32. A source station as claimed in claim 31, wherein said primary monitor and control means deactivates said second transmitting means and again activates said first transmitting means when said primary channel quality signal indicates that said channel quality is good.

33. A source station as claimed in claim 31, wherein said third transmitting means is activated by third starting means for transmitting a third start signal for use in said destination station in detecting said channel quality before activation in said source station of said third transmitting means.

34. A source station as claimed in claim 33, wherein said third start signal comprises a third synchronizing signal and a third starting signal.

35. A source station as claimed in claim 33, further comprising third quality monitoring means for monitoring a third channel quality signal sent back from said destination station in response to said third start signal.

36. A source station as claimed in claim 33, further comprising secondary monitor and control means for monitoring a secondary channel quality signal sent back from said destination station in response to errors detected in the code blocks received at said destination station.

37. A source station as claimed in claim 36, wherein said secondary monitor and control means deactivates said third transmitting means and again activates said second transmitting means when said secondary channel quality signal indicates that said channel quality is good for transmission of said code words.

* * * * *

UNITED STATES PATENT AND TRADEMARK OFFICE
CERTIFICATE OF CORRRECTION

Page 1 of 2

PATENT NO. : 5,835,508
DATED : November 10, 1998
INVENTOR(S) : Masayuki Kushita It is certified that error appears in the above-identified patent and that said Letters Patent is hereby corrected as shown below:

Title page, item [56], insert the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 4 | 0 | 4 | 7 | 1 | 5 | 1 | 09/06/77 | Rydbeck et al | | | |
| | | | | | | | | | | | | | |

UNITED STATES PATENT AND TRADEMARK OFFICE
CERTIFICATE OF CORRRECTION

PATENT NO. : 5,835,508
DATED : November 10, 1998
INVENTOR(S) : Masayuki Kushita It is certified that error appears in the above-identified patent and that said Letters Patent is hereby corrected as shown below:

Title page, item [56], insert the following:

FOREIGN PATENT DOCUMENTS

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | EPA | 0 | 0 | 0 | 8 | 0 | 16 | 02/20/80 | EUROPE | | | | |
| | | EPA | 0 | 1 | 5 | 4 | 5 | 65 | 09/11/85 | EUROPE | | | | |
| | | WO | 97 | 4 | 5 | 9 | 7 | 6 | 12/04/97 | PCT | | | | |
| | | | | | | | | | | | | | |

Signed and Sealed this

Sixth Day of April, 1999

Attest:

Q. TODD DICKINSON

Attesting Officer

Acting Commissioner of Patents and Trademarks